April 26, 1960
H. B. PUCKETT
2,934,224
GRAIN BIN UNLOADER
Filed Oct. 2, 1958
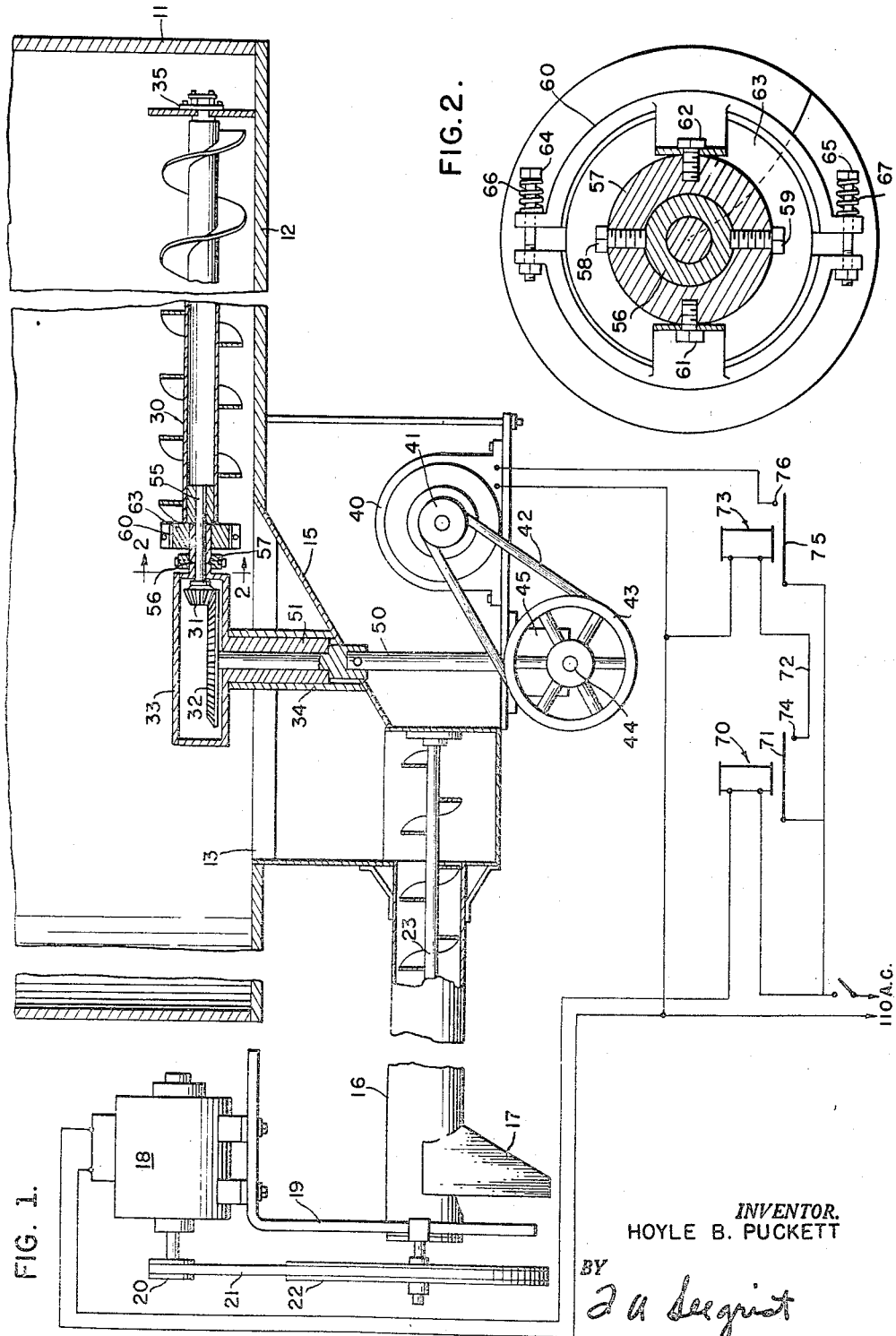
INVENTOR.
HOYLE B. PUCKETT
BY
*J. U. Seegrist*
ATTORNEY

2,934,224

GRAIN BIN UNLOADER

Hoyle B. Puckett, Champaign, Ill., assignor to the United States of America as represented by the Secretary of Agriculture Application October 2, 1958, Serial No. 765,007

2 Claims. (Cl. 214—17)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to an unloader for grain bins and has among its objects an unloader which can be installed in a flat bottom bin and has provisions for automatically removing grain from the flat part of the bottom into the hopper from which the grain is conveyed.

Conventional unloaders are provided in which the grain feeds by gravity from a bottom center exit into a hopper. Grain lying on the bottom at the sides of the exit will not flow into it. The present unloader automatically removes such bottom lying grain.

In general, according to the invention, the unloader is provided with a hopper into which grain feeds by gravity from the exit in the central portion of a flat bottom bin and with a power operated conveyer for removing the grain from the hopper. A sweep-auger is mounted inside the bin slightly above and parallel with the bin bottom with the delivery end of the sweep-auger adjacent the exit. Power means is provided to rotate the sweep-auger to move grain to the exit and to propel the sweep-auger sweepwise around the exit so that as the sweep-auger is rotated and propelled sweepwise the grain is moved from the bottom of the bin into the exit. The power operated conveyer and power means for rotating the sweep-auger and for propelling it sweepwise are so associated that while the hopper remains sufficiently filled due to gravity feed of the grain into it, the power means for rotating the sweep-auger and for propelling it remains inactive. Upon emptying of the hopper, with a consequent decrease in power for powering the conveyer, the power means for rotating and for propelling the sweep-auger is activated, thereby to move the grain into the hopper until the load is sufficient to again inactivate the power means rotating and propelling the sweep-auger.

For a description of the invention in detail reference is made to the accompanying drawing in which:

Figure 1 is a side elevation of the grain bin unloader in installed position with parts in section and parts broken away to illustrate the internal structure and with certain of the wiring circuit shown schematically; and Figure 2 is an enlarged section on line 2—2 of Figure 1.

The grain bin shown is of the usual cylindrical shape having a side wall 11 and flat bottom 12. It is provided with a central bottom exit 13 from which the grain flows by gravity during the unloading of the bin.

The unloader is provided with a hopper 15 to receive the discharging grain. Screw conveyer 16, of a usual type, removes grain from the hopper to the discharge chute 17. An electrical motor 18, mounted on frame 19, is the power means for driving the screw conveyer. Motor 18, provided with drive sheave 20, drives V-belt 21, which drives sheave 22 fixed to the screw 23 of the conveyer.

Sweep-auger 30 has fixed to its forward end a bevel gear 31 meshed with gear 32, gears 31 and 32 being enclosed in housing 33 rotatably mounted on top of fixed tube 34. The free end of the sweep-auger is carried by supporting wheel 35.

An electric motor 40 is provided with a sheave 41 driving a V-belt 42, which in turn drives a sheave 43. Sheave 43 drives shaft 44. Shaft 44 is suitably connected through gears in gear box 45 to shaft 50, the upper end of which is rotatably supported in bearing 51 and drives gear 32.

The structure above described provides for rotating the sweep-auger and causes it to exert a tendency to sweep around over the bottom of the bin. This latter tendency results from the fact that the housing 33 is free to rotate on the tube 34. The drag on the sweep-auger due to its rotation in the load of grain tends to prevent rotation of the sweep-auger, with the result that rotation of gear 32 tends to carry gear 31 along in the sweepwise manner.

In order to add resistance to rotation of the sweep-auger a drag brake is provided for further retarding its rotation, thus enhancing its tendency to move sweepwise. The sweep-auger stub shaft 55 is journaled in bearing 56 fixed to housing 33 and projecting outwardly from the housing. Collar 57 is stationarily mounted on bearing 56 by studs 58 and 59 and carries a member such as a brake band 60 secured thereto by bolts 61 and 62. The sweep-auger is fixed to stub shaft 55 and carries another brake member such as a brake drum 63 fixed thereto. The brake band 60 is made to engage the drum with a constant adjustable pressure, such pressure being obtained by adjusting means, such as bolts 64 and 65 and springs 66 and 67.

Proper adjustment of the drag brake results in the sweep-auger sweeping into the grain only to extent necessary to keep the auger loaded. If the brake is not set sufficiently tight the auger rotates and does not sweep. If the brake is set so tight as to lock the rotation, the auger sweeps and does not rotate. The proper setting is such as to cause sweeping only sufficient to keep the auger loaded, thus avoiding power loss and undue wear on the drag brake.

Means is provided automatically to apply power to the sweep-auger only when the bin has been emptied to the point that all grain which will flow by gravity has been removed, that is the sweep-auger is powered only when the hopper 15 empties and the power requirement to motor 18 is correspondingly lessened.

Power is supplied from the regular 110-volt power supply directly to motor 18, one wire of the circuit being through the solenoid of relay 70. While motor 18 is drawing heavy current the armature 71 of the relay is held in the open position as illustrated in Fig. 1, and no current flows through conductor 72 to relay 73. When the current in motor 18 drops, due to lessened load on the conveyer, armature 71 closes to contact 74, thus to energize relay 73, causing its armature 75 to close to contact 76, thus to connect power from the 110-volt supply to motor 40.

When the sweep-auger moves sufficient grain into hopper 15, the power on motor 18 causes sufficient current in relay 70 to energize it and the armature 71 opens from contact 74, thus de-energizing relay 73 and opening its armature 75 from contact 76 and disconnecting motor 40.

A significant advantage of the sweep-auger arrangement is its ability automatically to break grain bridges which may form over the exit 13. In case of such a bridge the resulting unloading of motor 18 energizes motor 40. Rotation of the sweep-auger breaks the bridge and the grain flows again by gravity into hopper 15.

I claim:

1. An unloader for a flat-bottom grain bin having a central exit, said unloader comprising a horizontal sweep-auger for positioning in the bin with the delivery end of the auger adjacent the exit, power means for rotating the sweep-auger to move the grain lying on the bottom of the bin around the exit into the exit and for propelling the auger sweepwise around the exit, a bevel gear driven by said power means and meshed with a bevel gear fixed to the sweep-auger, a housing enclosing the bevel gears, the sweep-auger being journaled in a bearing fixed to said housing and the housing being mounted to move sweepwise with said sweep-auger, and an adjustable drag brake for adding resistance to rotation of the sweep-auger, thus to enhance its tendency to move sweepwise.

2. The unloader of claim 1 wherein the drag brake comprises a pair of brake members engaging each other with a constant adjustable pressure, one of said members being stationarily mounted relative to the housing and the other being fixed to rotate with the sweep-auger.

References Cited in the file of this patent

UNITED STATES PATENTS

| | | |
|---|---|---|
| 1,274,548 | Holnagel et al. | Aug. 6, 1918 |
| 2,592,559 | Graham | Apr. 15, 1952 |
| 2,648,461 | Stephenson | Aug. 11, 1953 |
| 2,687,817 | Browne | Aug. 31, 1954 |